United States Patent
Byrd et al.

(10) Patent No.: US 8,048,360 B2
(45) Date of Patent: Nov. 1, 2011

(54) METHOD FOR CURING RESIN WITH ULTRASOUND

(75) Inventors: Norman R. Byrd, Villa Park, CA (US); Masood A. Zaidi, Placentia, CA (US); John A. Petty, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 176 days.

(21) Appl. No.: 12/411,076

(22) Filed: Mar. 25, 2009

(65) Prior Publication Data

US 2010/0244327 A1 Sep. 30, 2010

(51) Int. Cl.
*B06B 1/14* (2006.01)
(52) U.S. Cl. ......... 264/443; 264/442; 264/494; 264/496
(58) Field of Classification Search .................. 264/442, 264/443, 494, 496
See application file for complete search history.

(56) References Cited

U.S. PATENT DOCUMENTS

| | | | |
|---|---|---|---|
| 3,618,599 A | 11/1971 | Beightol | |
| 4,689,244 A | 8/1987 | Lusk | |
| H465 H * | 5/1988 | Brown | 73/590 |
| 5,009,104 A * | 4/1991 | Johnson | 73/597 |
| 5,634,743 A | 6/1997 | Chandler | |
| 5,888,645 A | 3/1999 | Lindgaard et al. | |
| 6,432,236 B1 * | 8/2002 | Leemon et al. | 156/73.1 |
| 6,511,563 B2 * | 1/2003 | Roylance et al. | 156/73.1 |
| 6,592,799 B1 * | 7/2003 | Christensen et al. | 264/442 |
| 6,827,896 B2 * | 12/2004 | Christensen et al. | 264/442 |
| 2001/0011570 A1 * | 8/2001 | Roylance et al. | 156/73.1 |
| 2008/0178986 A1 * | 7/2008 | Siavoshani et al. | 156/73.1 |
| 2008/0182943 A1 * | 7/2008 | Goetter et al. | 525/409 |
| 2009/0004401 A1 * | 1/2009 | Nojo et al. | 427/508 |

FOREIGN PATENT DOCUMENTS

WO  WO 93/15131  *  8/1993

\* cited by examiner

*Primary Examiner* — Yogendra Gupta
*Assistant Examiner* — Robert J Grun
(74) *Attorney, Agent, or Firm* — Eric K. Satermo

(57) ABSTRACT

A method for curing a resin includes the steps of placing the resin into a reaction vessel, drawing a vacuum in the reaction vessel, positioning the reaction vessel in a gaseous coupling fluid, and applying ultrasonic energy to the coupling fluid.

16 Claims, 2 Drawing Sheets

METHOD FOR CURING RESIN WITH ULTRASOUND

FIELD

The present patent application relates to methods for curing polymeric materials and, more particularly, to methods for curing polymeric resins using ultrasound, wherein the cured resins are useful for bonding and/or for the formation of various articles, including composite materials.

BACKGROUND

Synthetic resins, such as epoxy resins, polyester resins and the like, are commonly used as adhesives for bonding two substrates together. However, synthetic resins are also combined with appropriate substrates, such as fibers, glass, metals and wood, to form composite materials. Such composite materials find application in a variety of fields and industries. For example, synthetic resin-based composite materials are used in the aerospace industry to form parts, propellers, tails, wings and fuselages.

Composite materials typically are formed by preparing the synthetic resin (e.g., mixing a polymer with a catalyst), combining the substrate with the synthetic resin, molding the substrate and resin mixture into the desired shape, and curing the molded substrate and resin mixture until it achieves the desired physical properties. Once cured, the resulting composite material may be removed from the mold, at which point it is ready for use, packaging or further processing.

Common molding techniques include vacuum bag molding, pressure bag molding and autoclave molding. In vacuum bag molding, a mold or form, such as a two-sided mold, is filled with the substrate and resin mixture and placed into a vacuum bag. Then, a vacuum is drawn in the vacuum bag to urge the substrate and resin mixture into the various nooks and crannies of the mold. The vacuum bag is then sealed and cured.

Various techniques have been presented for curing synthetic resin. Most commonly, heat is used to cure resins. For example, sealed vacuum bags may be cured in an oven for a predetermined amount of time. However, alternative techniques for curing synthetic resins include the application of high pressure, whether alone or in combination with heat, as well as exposure to ultraviolet light.

Despite the advances in the field of synthetic resin curing and composite material formation, those skilled in the art continue to seek new techniques for curing synthetic resins and forming composite materials.

SUMMARY

In one aspect, the disclosed method for curing a resin may include the steps of positioning the resin in a gaseous coupling fluid and applying ultrasonic energy to the gaseous coupling fluid until the resin becomes a solid mass.

In another aspect, the disclosed method for curing a resin may include the steps of placing the resin into an appropriate reaction vessel, drawing a vacuum in the reaction vessel, positioning the vacuumed reaction vessel in a gaseous coupling fluid, and applying ultrasonic energy to the gaseous coupling fluid.

In another aspect, the disclosed method for curing resins may include the steps of placing an epoxy resin into an appropriate vessel, such as a film pouch, the epoxy resin including a catalyst, sealing the vessel, positioning the sealed vessel in a gaseous coupling fluid, and applying ultrasonic energy to the gaseous coupling fluid at least until the epoxy resin becomes a solid mass.

In another aspect, the disclosed method for curing resins may include the steps of placing an epoxy resin into a vacuum bag, the epoxy resin including a catalyst, placing a mold into the vacuum bag, drawing a vacuum in the vacuum bag, sealing the vacuum bag, positioning the sealed vacuum bag in a gaseous coupling fluid, and applying ultrasonic energy to the gaseous coupling fluid at least until the epoxy resin becomes a solid mass.

Other aspects of the disclosed method for curing resin will become apparent from the following description, the accompanying drawings and the appended claims.

DETAILED DESCRIPTION

The first observation of the effect of ultrasonics was the discovery in 1894 by Sir John I. Thornycroft and Sydney W. Burnaby. Messrs. Thornycroft and Burnaby observed that severe vibrations caused the erosion of a ship's propeller, and that the erosion was attributable to the formation and collapse of tiny bubbles that from at the propeller. Over the years, knowledge of ultrasound has grown. Today, the generation and use of ultrasonic energy is found in various applications.

Ultrasound (also referred to as "ultrasonic energy") can be transmitted through any material possessing elastic character. For example, when ultrasonic energy is applied to a liquid, the molecules in the liquid vibrate. As the average distance between the molecules in the liquid exceeds the critical molecular distance that holds the liquid intact, the liquid breaks down forming bubbles that cavitate. These bubbles can be filled with gas or vapor and occur in various fluids including water, organic solvents, biological fluids, liquid helium, molten metals and the like.

It has been determined that the collapse (i.e., cavitation) of ultrasonically-formed bubbles results in localized temperatures as high as 5000° C. and pressures as high as 1000 atmospheres for a lifetime of less than one microsecond. Thus, the cavitation of a fluid due to exposure to ultrasound results in a tremendous concentration of localized energy in an otherwise relatively cold fluid.

It has now been discovered that ultrasonic energy, and the phenomena associated therewith, can be used to cure various synthetic resins, which may ultimately be used in the formation of composite materials, adhesive bonding, and the repair of damaged composite materials. Indeed, when ultrasound is used to cure synthetic resins, it may eliminate the need for heat and may also expedite the curing process relative to other curing techniques.

Figure 1:
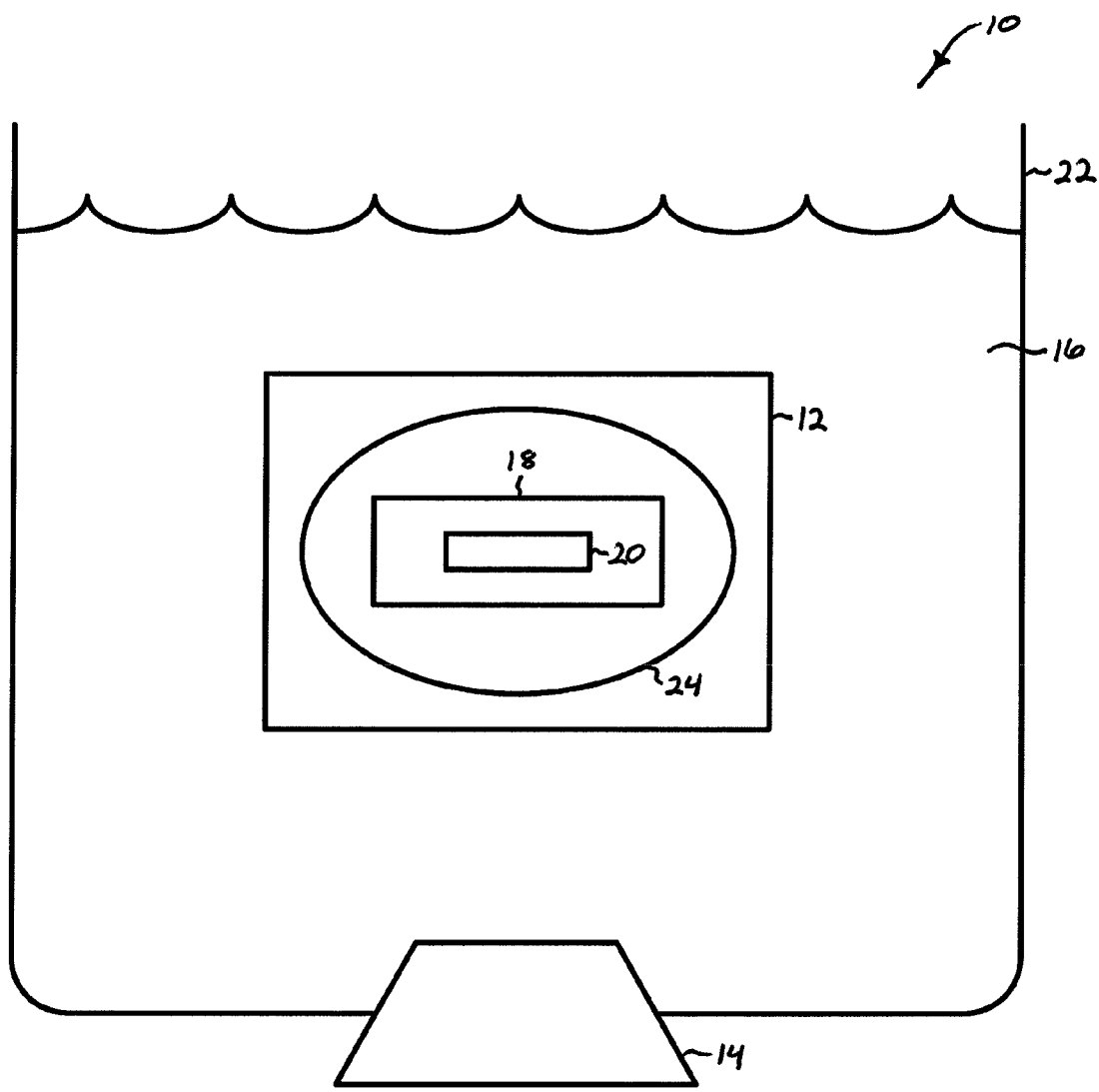
FIG. 1 is a block diagram of an apparatus for curing resins in accordance with an aspect of the disclosed method for curing resin.

As shown in FIG. 1, an apparatus for curing resins, generally designated 10, may include a reaction vessel 12, an ultrasound transducer 14, a gaseous coupling fluid 16 and a resin 18 (shown generally as a block). The resin 18 may be positioned in the reaction vessel 12 and the reaction vessel 12 may be positioned in the gaseous coupling fluid 16 such that ultrasonic energy may pass from the ultrasound transducer 14, through the gaseous coupling fluid 16 and to the resin 18 in the reaction vessel 12, thereby curing the resin 12 therein.

The resin 18 may be any synthetic resin capable of being cured upon exposure to ultrasonic energy for a certain amount of time. Optionally, the resin 18 may include a catalyst 20 (shown generally as a block), such as a curing agent or hardener, to facilitate or promote the curing process. In one aspect, the resin 18 may be an epoxy resin. One example of an appropriate epoxy resin is HYSOL® EA 956 epoxy resin available from Henkel Corporation of Bay Point, Calif., which is a two-component epoxy resin (i.e., it includes a catalyst 20). Another example of an appropriate epoxy resin is EPOFIX resin available from Struers A/S of Ballerup, Denmark, which is a two liquid system that includes both a resin and a hardener (i.e., a catalyst 20).

Optionally, the resin 18 may be combined with one or more substrates (not shown), such as fibers, glass, metals and wood, to form a composite material. The substrate may be selected based upon the intended use of the composite material. For example, the substrate may be used to reinforce the composite material or may be used to impart certain desired physical properties to the composite material (e.g., thermal conductivity). Those skilled in the art will appreciate that, depending on the desired result and/or the type of substrate used, the substrate may be dispersed in the resin, the resin may impregnate the substrate, or some other resin/substrate configuration may be used.

The gaseous coupling fluid 16 may be any gas capable of acoustically coupling the ultrasound transducer 14 to the reaction vessel 12, and ultimately to the resin 18 disposed therein. In one particular aspect, the gaseous coupling fluid 16 may be received in a vessel 22, such as a tank or barrel. For example, the gaseous coupling fluid 16 may be ambient air, or an inert gas such as nitrogen gas, argon gas, or the like. Other examples of useful gaseous coupling fluids 16 will be readily apparent to those skilled in the art.

The temperature and pressure of the gaseous coupling fluid 16, as well as other physical conditions of the gaseous coupling fluid 16, may be at ambient conditions (e.g., 25° C. and 1 atm), thereby eliminating the need for ovens, pressure vessels, autoclaves and the like. However, those skilled in the art will appreciate that the physical conditions of the gaseous coupling fluid 16 may be controlled as desired without departing from the scope of the present disclosure. Optionally, the physical conditions of the coupling fluid 16 may be dictated by the type of resin 18 being cured.

The ultrasound transducer 14 may be any device capable of generating ultrasonic energy. In one aspect, the ultrasound transducer 14 may generate ultrasonic energy in the range of about 20 to about 40 kHz. For example, the ultrasound transducer 14 may be of the type found in a common ultrasonic cleaner, such as a typical ultrasonic jewelry cleaner having an integral couplant vessel. In another aspect, the ultrasound transducer 14 may generate ultrasonic energy in excess of 40 kHz.

As shown in FIG. 1, the ultrasound transducer 14 may be in direct acoustical contact with the gaseous coupling fluid 16. For example, the ultrasound transducer 14 may be an ultrasonic horn (e.g., a titanium horn) that has been directly immersed in the gaseous gaseous coupling fluid 16. Alternatively, an intermediate coupling agent may be disposed between the ultrasound transducer 14 and the gaseous coupling fluid 16.

The reaction vessel 12 may be any appropriate vessel capable of transmitting ultrasonic energy from the gaseous coupling fluid 16 to the resin 18 received therein, while essentially isolating the resin 18 from the gaseous coupling fluid 16. In one exemplary aspect, the reaction vessel 12 may be a vacuum bag, wherein the resin 18 may be received in the vacuum bag and ambient air may be evacuated from the vacuum bag.

Optionally, as shown in FIG. 1, a mold 24, such as a two-piece or two-sided mold, may be positioned in the reaction vessel 12 with the resin 18. Then, by drawing a vacuum in the reaction vessel 12, the resin 18 may be urged into the mold 24 and, when cured, may conform to the shape of the mold 24. Those skilled in the art will appreciate the techniques other than vacuum molding may also be used with the apparatus 10 without departing from the scope of the present disclosure.

Figure 2:
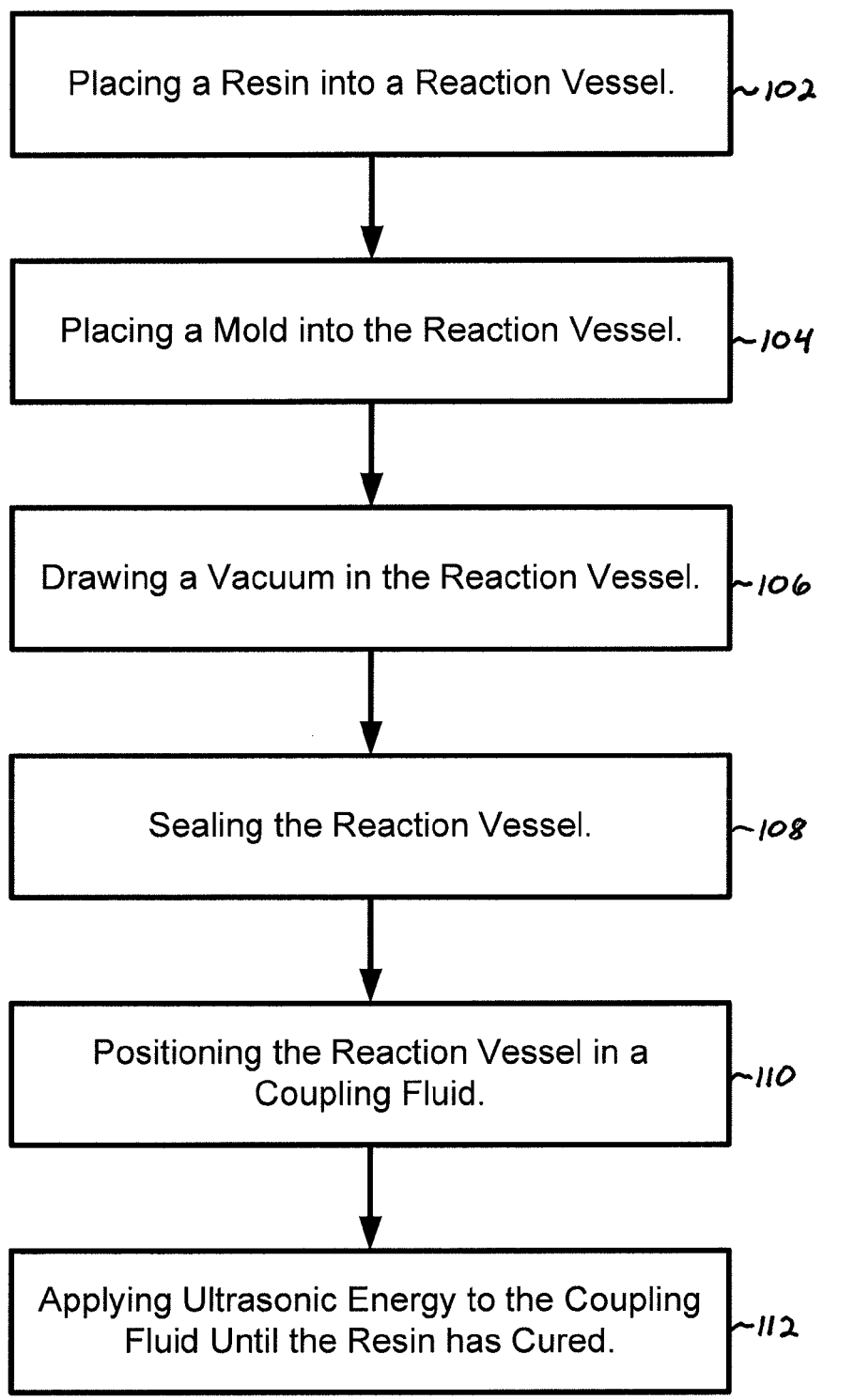
FIG. 2 is a flow chart illustrating a particular aspect of the disclosed method for curing resin.

Referring now to FIGS. 1 and 2, one aspect of the disclosed method for curing resin, generally designated 100, begins at block 102 by placing the resin 18 into the reaction vessel 12 (e.g., a vacuum bag). Optionally, the resin 18 may be premixed with a catalyst 20 or the catalyst 20 may be introduced separately and mixed in the reaction vessel 12. If the resin 18 is to be molded, a mold 24 may be placed in the reaction vessel 12, as shown in block 104. Then, a vacuum may be drawn in the reaction vessel 12 (block 106) and the reaction vessel 12 may be sealed (block 108) to maintain the vacuum. As shown in block 110, the sealed reaction vessel 12 may be positioned (e.g., immersed or supported by a structure) in the gaseous coupling fluid 16 and the ultrasound transducer 14 may be actuated (block 112) to apply ultrasonic energy to the resin 18 to cure the resin 18. The application of ultrasonic energy may continue until the resin 18 is completely cured or at least forms a solid mass.

Accordingly, the curing of resins, such as epoxy resins, may be obtained by placing the a resin in an ultrasonic field to receive ultrasonic energy. Of particular interest, a complete resin cure may be obtained faster when ultrasonic energy is used.

Although various aspects of the disclosed method for curing resin have been shown and described, modifications may occur to those skilled in the art upon reading the specification. The present application includes such modifications and is limited only by the scope of the claims.

What is claimed is:

1. A method for curing a resin comprising the steps of:
    placing said resin into a reaction vessel wherein said resin is capable of being cured upon exposure to ultrasonic energy;
    drawing a vacuum in said reaction vessel;
    positioning said reaction vessel in a gaseous coupling fluid wherein said gaseous coupling fluid is at ambient temperature and pressure; and
    applying ultrasonic energy to said gaseous coupling fluid to cure said resin.

2. The method of claim 1 wherein said resin is an epoxy resin.

3. The method of claim 2 wherein said epoxy resin includes a catalyst.

4. The method of claim 1 wherein said reaction vessel is a vacuum bag.

5. The method of claim 4 further comprising the step of placing at least one mold into said vacuum bag.

6. The method of claim 1 further comprising the step of sealing said reaction vessel prior to said positioning step.

7. The method of claim 1 wherein said gaseous coupling fluid is ambient air.

8. The method of claim 1 wherein said gaseous coupling fluid is an inert gas.

9. The method of claim 1 wherein said applying step includes positioning an ultrasound transducer in said gaseous coupling fluid and actuating said ultrasound transducer.

10. The method of claim 1 wherein said applying step continues at least until said resin becomes a solid mass.

11. The method of claim 1 further comprising the step of combining said resin with a substrate to form a composite material.

12. A method for curing an epoxy resin comprising the steps of:
placing said epoxy resin into a vacuum bag, said epoxy resin including a catalyst;
placing a mold into said vacuum bag;
drawing a vacuum in said vacuum bag;
sealing said vacuum bag;
positioning said sealed vacuum bag in a gaseous coupling fluid wherein said gaseous coupling fluid is at ambient temperature and pressure; and
applying ultrasonic energy to said gaseous coupling fluid at least until said epoxy resin becomes a solid mass.

13. The method of claim 12 wherein said gaseous coupling fluid is ambient air.

14. The method of claim 12 wherein said gaseous coupling fluid is an inert gas.

15. The method of claim 12 wherein said applying step includes positioning an ultrasound transducer in said gaseous coupling fluid and actuating said ultrasound transducer.

16. The method of claim 12 further comprising the step of combining said resin with a substrate to form a composite material.

* * * * *